United States Patent [19]

Gell et al.

[11] 4,410,997

[45] Oct. 18, 1983

[54] FURNACES FOR THE MELTING OF GLASS

[75] Inventors: Philip A. M. Gell, Stourbridge; Douglas G. Hann, Shifnal, both of England

[73] Assignee: TECO/Elemelt Ltd., Kingwinford, England

[21] Appl. No.: 267,564

[22] Filed: May 27, 1981

[51] Int. Cl.³ .......................... C03B 5/027; C03B 5/26

[52] U.S. Cl. .......................................... 373/35; 373/40; 373/41

[58] Field of Search ....................... 373/39, 40, 41, 35, 373/33, 135, 120

[56] References Cited

U.S. PATENT DOCUMENTS 4,000,360 12/1976 Gell et al. ............................ 373/41

4,247,733 1/1981 Stevenson ............................ 373/39

*Primary Examiner*—Roy N. Envall, Jr.

*Attorney, Agent, or Firm*—Spencer, Kaye & Frank

[57] ABSTRACT

A furnace for the melting of glass in which horizontally spaced regions of the molten glass body are heated by passage of alternating electric current between diagonally opposed electrodes of two groups and supplied from a primary power supply circuit, and in an intervening zone above a withdrawal path leading to an outlet auxiliary electrodes spaced apart longitudinally of the zone are fed with current from an auxiliary supply circuit including regulators providing for adjustment of the heating effect along different parts of the zone to set up a convective effect balancing any downward pull which could draw unrefined glass or batch material into the withdrawal path.

8 Claims, 3 Drawing Figures

FURNACES FOR THE MELTING OF GLASS

FIELD OF THE INVENTION

This invention is concerned with a furnace for the melting of glass, of the kind wherein the furnace comprises a chamber, groups of primary electrode means in the chamber defining respective heating zones situated in horizontally spaced regions of the chamber, an intervening zone between the heating zones, withdrawal means defining a withdrawal flow path in the bottom of the furnace chamber and which extends generally along the lower part of said intervening zone towards an outlet situated in the lower part of one of the peripheral walls of the furnace chamber, and a power supply circuit connected to the groups of primary electrodes, to supply electric current to said groups to heat glass in the heating zones. Such a furnace is hereinafter referred to as "a furnace of the kind specified" and one form thereof is the subject of our prior U.S. Pat. No. 4,000,360.

BACKGROUND OF THE INVENTION

When a furnace of the kind specified is operated to raise the temperature of the bodies of molten glass in the heating zones by the passage of electric current therethrough, and the body of glass in the intervening zone by conductive transference of heat to the ideal operating temperature, or a temperature in the region thereof, withdrawal of glass is effected from positions distributed over a wide area of the lower part of the bodies of molten glass and the withdrawn glass is replaced by generally descending glass in the furnace chamber, itself replaced by melting from the underside of a blanket of solid state glass making material or batch lying on the surface of the molten glass bodies.

One of the problems encountered in a glass melting furnace of the kind specified is that for a given glass composition and for a given throughput (i.e. tonnage to be withdrawn from the furnace over a given period) the glass in the furnace chamber is ideally maintained at or in the region of a specific temperature, and undergoes heating in the chamber for, or in the region of, a specific residence time. It will thus be appreciated that for a given throughput the residence time is determined by the size of the chamber.

In many instances, it is required to supply molten glass at variable rates, depending upon the nature of the glass utilisation process for which the glass is required. Since it is not practical to alter the volume of the furnace chamber, variable demand for the supply of molten glass results in the glass supplied at different times having undergone different periods of residence in the furnace chamber. In general, the size of the furnace chamber will be determined by the maximum throughput which it is required to handle, to ensure that the glass arriving at the point of use is in a satisfactorily refined condition. Thus, any reduction in the rate of throughput will result in the glass having a longer residence time in the furnace chamber than is ideal. When the residence time increases due to the reduced input, various undesirable effects occur.

Thus, if the temperature of the glass in the furnace is not reduced, there will be a reduction in the thickness of the blanket of batch covering the bodies of molten glass in the furnace chamber. The heat insulating effect achieved by the presence of the batch blanket over part or all of the surface of the chamber is reduced or lost, especially if at one or more places it becomes molten prematurely throughout its thickness.

To prevent this, for throughputs less than the maximum for which the furnace is designed to handle, the temperature of the body of molten glass in the furnace chamber requires to be reduced.

If the temperature is reduced, the viscosity of the glass is lowered and the pattern of flow of glass towards the outlet tends to be disturbed. In particular, there is an increased tendency for portions of glass contained in the molten body of glass occupying the intervening zone and which lies adjacent to and above the withdrawal flow path to become entrained in the withdrawal flow, whereas at the ideal operating temperature this would not be the case. There is, in consequence, a risk that insufficiently refined glass, or glass containing particles of solid state batch material, may be drawn into the withdrawal flow path especially from a region adjacent to the surface of the glass and in the vicinity of the outlet.

In our U.S. Pat. No. 4,000,360 there is suggested, as a means of overcoming or reducing this problem, the expedient of electrically heating the body of molten glass locally above said withdrawal flow path in the vicinity of the outlet, to produce an upward convective pressure to counteract the downward pull exerted on such glass by the entrainment effect of flow along the withdrawal path. The electrical heating is effected by the provision of auxiliary electrode means in the vicinity of the outlet and an auxiliary power supply circuit is provided for connection to said auxiliary electrode means for the feed of electrical current thereto.

In this manner, some current will flow through the body of molten glass in the intervening zone above and across the withdrawal flow path locally in the vicinity of the outlet to produce an upward convective pressure to counteract the downward pull exerted on such glass by the entrainment effects of the flow along the withdrawal path. However, it has been found that, in certain circumstances, the fact that the intervening zone as a whole is not heated may produce disadvantageous effects. In particular where a large temperature differential exists between the heating zones and the intervening zone, convective currents may be produced which cause partially melted or unrefined glass to be pulled into the withdrawal flow path at regions spaced laterally from any such local heating which may be effected in the vicinity of the outlet. Such partially melted or unrefined glass will then be entrained in the stream of glass being withdrawn from the furnace chamber, and will pass beneath any such local heating means without being brought to the surface and will accordingly pass through the outlet.

SUMMARY OF THE INVENTION

To overcome this problem, there is provided a furnace of the kind specified in which auxiliary electrode means is provided operable electrically to heat the body of molten glass in the intervening zone above said withdrawal flow path over a significant distance extending rearwardly from the outlet, and in which means is provided to vary the heat thus supplied at different positions along said distance.

Advantageously, said auxiliary electrode means is associated with an auxiliary power supply circuit which is operative to energise said auxiliary electrode means, said auxiliary power supply circuit including means for varying the current supplied to those of the auxiliary electrode means operative along and above part of the length of the flow path relatively to those operative along and above another part of such length, independently of the power supply circuit which is operative to energise the primary electrode means.

Thus, advantageously the auxiliary electrode means comprises a first auxiliary electrode, or a first group of auxiliary electrodes, situated in the vicinity of the outlet and adjacent to primary electrodes of the two groups of the primary electrode means in the vicinity of the outlet (for example between such primary electrodes), and a further auxiliary electrode, or further group of auxiliary electrodes, spaced longitudinally of the flow path from the outlet, said auxiliary power supply being connected to the auxiliary electrodes, or groups of auxiliary electrodes, in a manner such that the phase relationship between the voltage applied to the first auxiliary electrode, or first group of auxiliary electrodes, and that applied to said adjacent electrodes of the primary electrodes of the two groups is such that little current flow is established between the first auxiliary electrode, or first group of auxiliary electrodes, and the primary electrodes. For example, the phase relationship may be 45°. In this manner, the current flow between the said electrodes of the primary electrode means and said adjacent first auxiliary electrode, or first group of auxiliary electrodes, is of a sufficiently small magnitude that the disturbance to the pattern of current flow across the primary heating zone is minimised.

Conveniently, the further auxiliary electrode, or further group of auxiliary electrodes, which is spaced longitudinally of the flow path from the outlet is adjacent to adjacent primary electrodes of the two groups of the primary electrode means remote from the outlet, for example is generally between these primary electrodes. The phase relationship between the voltage applied to the further auxiliary electrode, or further group of auxiliary electrodes, and that applied to the adjacent primary electrode of the two groups is preferably such that little or no current flow is established between said further auxiliary electrode, or further group of auxiliary electrodes, and these primary electrodes. Thus, this phase relationship may again be 45°. In this manner, the current flow will be of sufficiently small magnitude that disturbance to the pattern of current flow across the primary heating zones is minimised.

The auxiliary electrode means advantageously comprises a third electrode, or third group of auxiliary electrodes, between said first and second electrodes or groups of these electrodes. The third auxiliary electrode, or third group of auxiliary electrodes, is thus energised in a phase relationship with the other auxiliary electrodes, or groups of auxiliary electrodes, of the auxiliary electrode means in a manner such that current flow between the first and third auxiliary electrode, or respective groups of such electrodes, is in phase or anti-phase with current flow between the second and third auxiliary electrodes, or respective groups of such electrodes, generally parallel to the withdrawal flow path.

Preferably said auxiliary supply circuit is controllable, advantageously independently of the primary supply circuit whereby the supply of power to the auxiliary electrode means may be varied in accordance with the conditions which prevail in the intervening zone itself.

Alternatively however said auxiliary electrode means may comprise groups of auxiliary electrodes, each group comprising auxiliary electrodes on opposite sides of the channel means. The connection between the groups of auxiliary electrodes and the auxiliary supply circuit may be arranged, in a manner such that electric current passes between the auxiliary electrodes of each group, that is across the channel means. However, whereas this is effective to produce local heating above the channel means, the provision of such heating at a location so close to the withdrawal flow path itself (which may extend into the intervening zone somewhat above the channel means) may interfere with the carefully controlled pattern of withdrawal flow towards the outlet.

DETAILED DESCRIPTION OF PREFERRED EMBODIMENTS

Figure 1:
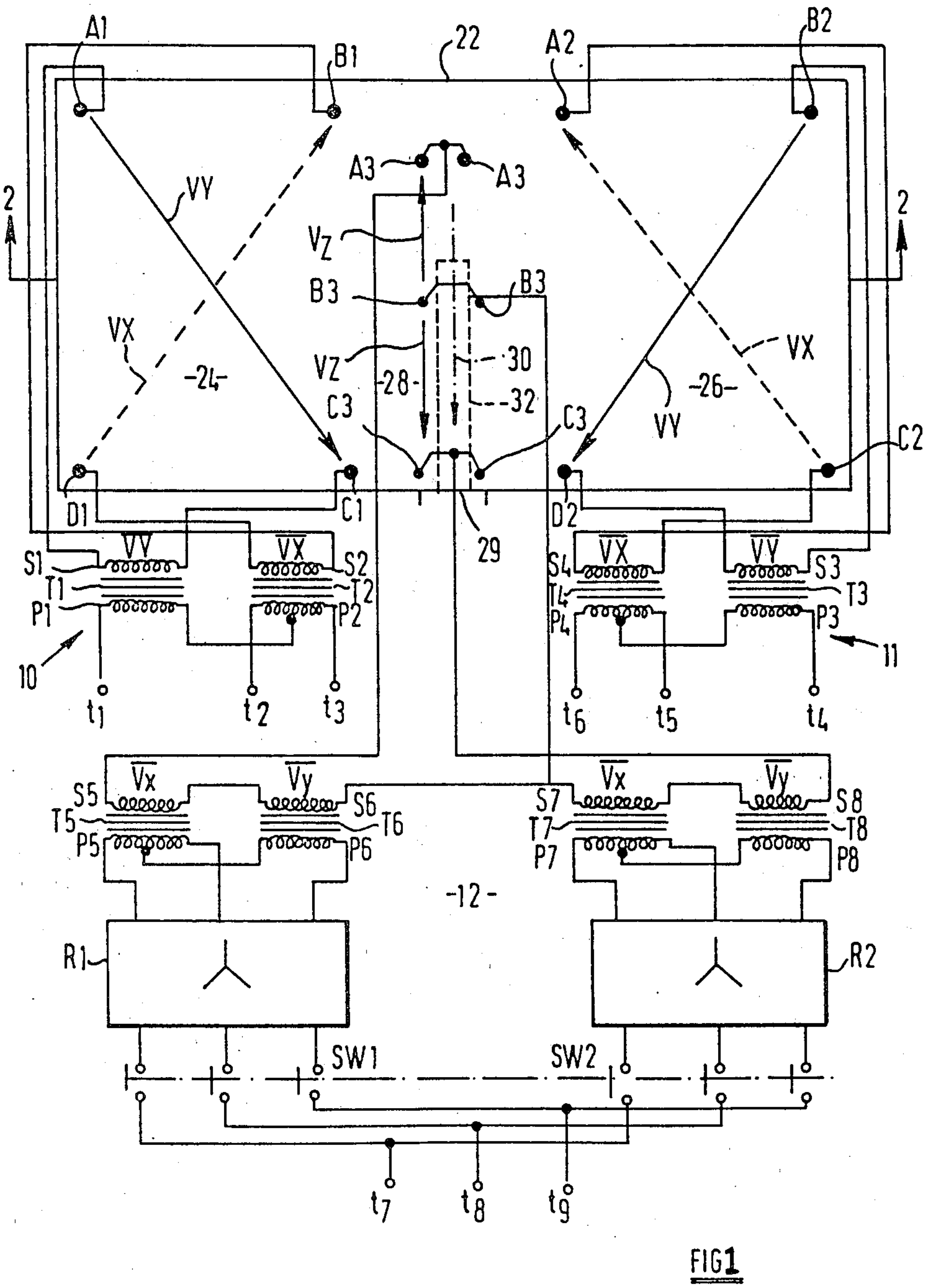
FIG. 1 is a schematic plan view of one embodiment of a furnace in accordance with the invention and which has been selected to illustrate the invention by way of example.
Figure 2:
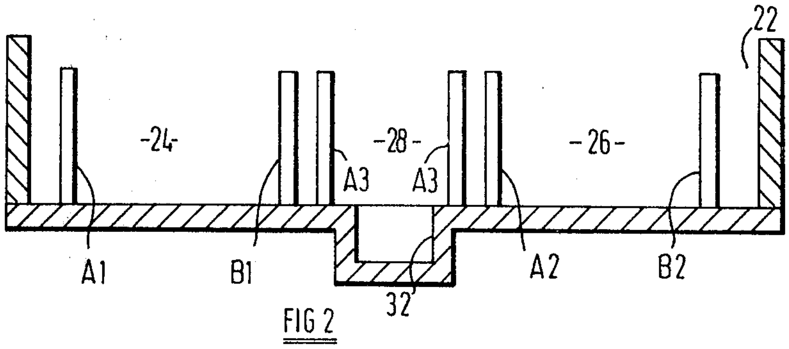
FIG. 2 is a schematic side sectional view, taken along the line 2—2 of FIG. 1.

The furnace shown in FIGS. 1 and 2 comprises an open-topped furnace chamber 22, a first group of primary electrode means A1 B1 C1 D1, and a second group of primary electrode means A2 B2 C2 D2, defining respective heating zones 24, 26.

In the bottom of the furnace (FIG. 2) and extending transversely from the outlet between the heating zones 24 and 26 there is provided a channel 32, which, in part, defines a withdrawal flow path 30 along which a stream of molten glass may be drawn through the outlet 29 from an intervening zone 28 between the heating zones. It will however be appreciated that, in the operation of the furnace, the flow of glass towards the outlet will not be confined solely to the channel 32 itself, but will also occupy a space somewhat above, and somewhat to the sides of the channel. The outlet 29 is preferably in the lower margin of one of the peripheral walls in alignment with the channel 32.

The first group of primary electrode means comprises four electrodes A1 B1 C1 and D1 situated at the corners of a generally rectangular figure, and the second group of primary electrode means also comprises four electrodes A2 B2 C2 and D2 situated at the corners of a generally rectangular figure spaced laterally from the first said rectangular figure. However, whereas the electrodes are shown in FIGS. 1 and 2 of the drawings as being in the form of single electrode elements, each may comprise a number of electrode elements electrically connected together.

The furnace also comprises power supply means to supply power to the electrode groups, to heat glass in the heating zones by the Joule heating effect. The power supply means comprises a first branch 10 associated with a first group of electrodes A1–D1, and comprising transformers T1, T2, having primary windings connected to three phase supply input terminals $t_1$ $t_2$ $t_3$ by a Scott connection, and having two secondary windings providing two phase voltages in quadrature and connected respectively across pairs of diagonally opposite electrodes A1, C1, and D1, B1 of the associated group. Similarly, a second branch 11 comprises Scott-connected transformers $T_3$ $T_4$ fed from the three phase supply at terminals $t_4$ $t_5$ $t_6$ (connected respectively to the same supply phases as $t_1$ $t_2$ $t_3$) and providing a two phase output across electrodes C2,A2 and B2,D2 in quadrature.

Figure 3:
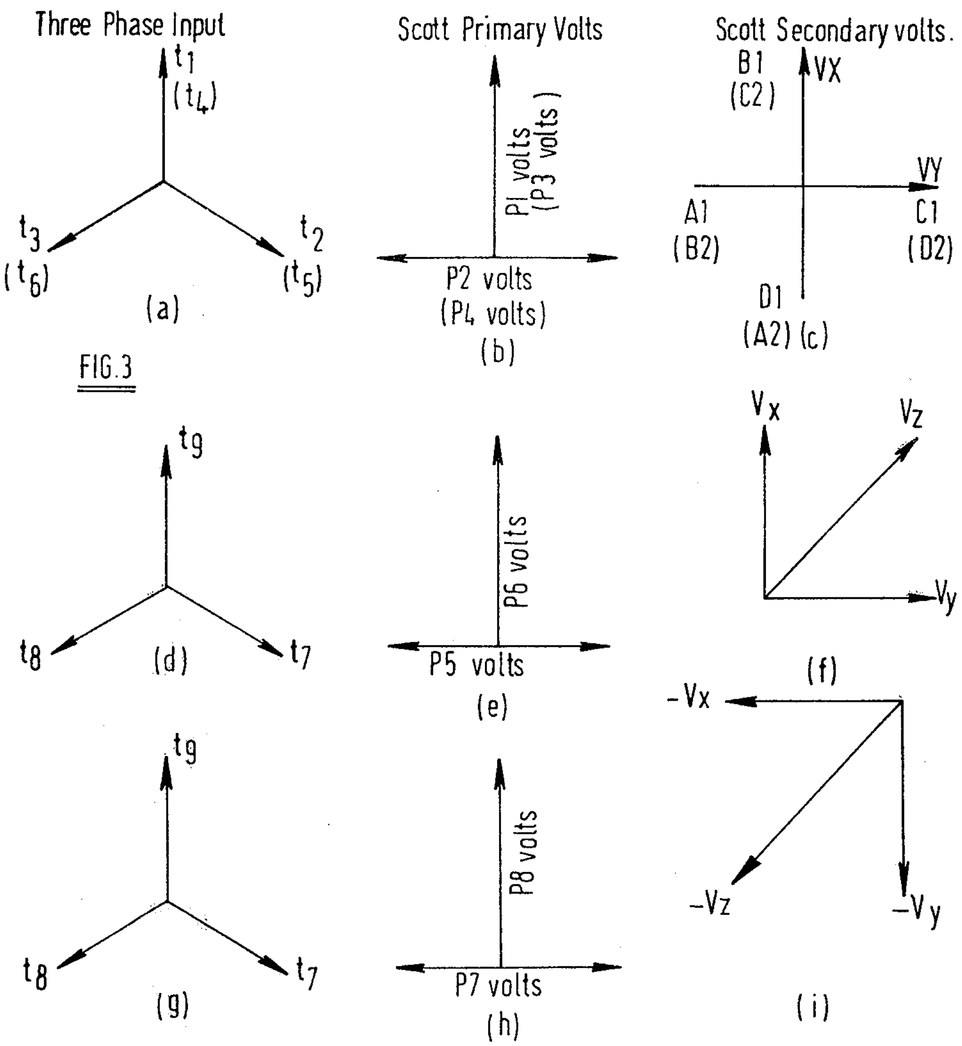
FIG. 3 illustrates vectorially the voltages at certain positions in the power supply of this embodiment.

The phase relationships between the three phase voltage applied to input terminals $t_1$ $t_2$ $t_3$ the voltages developed across the primary windings P1 and P2, and secondary windings $S_1$ and $S_2$ of the transformers T1 and T2 are shown in sections (a) (b) (c) of FIG. 3.

A like relationship exists in respect of the second branch of the supply circuit and corresponding references $t_4,t_5,t_6$, $P_3,P_4,S_3,S_4,A_2–D_2$ are shown in brackets.

The phase relationships between the voltages applied to the two groups of primary electrodes is such that the instantaneous voltage presented between adjacent electrodes B1 and A2, in different groups and between electrodes C1 and D2 in different groups is zero or substantially zero, and no current, or little current, flows across the intervening zone 28 between the electrodes B1, A2, and C1, D2. It will be noted that the voltages $V_z$ and $-V_z$ are 45° out of phase with voltages VX and VY applied diagonally across the electrode groups A1–D1, and A2–D2. The effect of this is still further to minimise any slight current flow.

To enable the temperature, and hence the upward convective effect to be precisely controlled in the intervening zone 28, independently of the magnitude of the voltages VX and VY applied diagonally across electrode group A1–D1 and A2–D2, the furnace includes auxiliary electrode means A3, B3, C3 and an auxiliary supply circuit 12 therefor.

The secondary electrode means provided, comprises three sets of electrodes, each set including two electrodes A3 B3 C3 one located on each side of the outlet channel 32. The two electrodes of each set are electrically connected together and the three sets are spaced from each other generally equidistantly along the length of the intervening zone 28.

The auxiliary supply circuit is in the form of Scott-connected transformers T5, T6, T7, T8, having respective primary windings P5, P6, P7, P8 and secondary windings S5, S6, S7, S8. Voltages $V_x$ are developed respectively across each of windings S5 and S7, and voltages $V_z$ across each of windings S6 and S8. Windings S5 and S6 connected in series to apply a voltage $V_z$ (the vector sum of $V_x$ and $V_y$) between electrodes B3 and A3 and S7 and S8 connected in series to apply an equal voltage $V_z$ (also the vector sum of $V_x$ and $V_y$) between electrodes B3 and C3, the phasing between P7 and S7 being reversed compared with that between P5 and S5, and the phasing between P8 and S8 being reversed compared with that between P6 and S6.

The phase relationship between the three phase supply input to terminals $t_7,t_8,t_9$ (in phase with the supply applied to $t_1,t_2,t_3$, and $t_4,t_5,t_6$), the voltages developed across the primary windings of Scott-connected transformers T5, T6 and T1, T8 and applied from the secondary windings respectively between electrodes B3, A3, and B3 C3, are shown in sections (d) (e) (f) and (g) (h) (i) of FIG. 3.

Little current will flow between the electrodes of the primary groups and the electrodes of the auxiliary groups, and the pattern and balance of current flow between the electrodes of the primary groups will be maintained or substantially maintained.

The input to terminals $t_7,t_8,t_9$ from the three phase supply is fed through isolator switches SW1, SW2 and then to the Scott-connected T5, T6 and T7, T8 transformers through control means providing for adjustment of the input. The control means may be in the form of voltage regulators R1, R2 whereby the voltage applied between the electrodes B3 and A3, and between the electrodes B3 and C3 may be regulated, independently of each other and independently of the input to electrodes A1–D1 and A2–D2.

Further adjustment means (not shown) in the form of voltage regulators may be provided for adjusting the input to electrodes A1–D1 and A2–D2.

Thus, general heating of the body of molten glass is carried out in the zones 28 extending generally parallel to and above the channel 32 can produce for an upward convective pressure adjusted precisely to counteract the downward pull exerted on the body of molten glass above the withdrawal flow path, by the entrainment effect of flow of molten glass along the withdrawal flow path. This can be achieved substantially along the whole of the channel 32, over a range of throughputs, and a range of temperatures in the zones 24 and 26.

It will be understood that although in the auxiliary circuit described the voltages $V_z$ applied respectively between B3 and C3, and between B3 and A3 are in opposite directions (anti-phase considering only a single direction C3 to A3) the auxiliary circuit could be so arranged that these voltages are applied in the same direction (in phase for the single direction).

Further, the pairs of electrodes A3, B3, C3 which are shown electrically strapped for each pair may be electrically separate and the auxiliary supply circuit may provide for application of a voltage across each pair A3A3, B3B3, C3C3 if desired.

We claim:

1. A furnace for the melting of glass, comprising a furnace chamber, groups of primary electrode means in the chamber defining respective heating zones situated in horizontally spaced regions of the chamber, an intervening zone in lateral communication with and situated between the heating zones, and withdrawal means defining a withdrawal flow path including a channel in the bottom of the furnace chamber and extending generally along the lower part of the intervening zone towards an outlet situated in the lower part of one of the peripheral walls of the chamber at one end of said channel, a power supply circuit connected to the primary electrode groups to supply current thereto to heat the glass in the heating zones, and auxiliary electrode means above said channel operable electrically to heat the body of molten glass in and along substantially the entire length of the intervening zone above said withdrawal flow path extending rearwardly from the outlet, and means to vary the heat thus supplied at different positions along said distance.

2. A furnace according to claim 1 wherein said auxiliary electrode means comprises auxiliary electrodes at opposite lateral boundaries of and above said channel at positions spaced apart longitudinally of said intervening zone, an auxiliary power supply circuit is connected to said auxiliary electrodes in a circuit configuration to supply current to those of the auxiliary electrodes operative along and above part of the length of the flow path and to supply current to those operative along and above another part of such length, and means for varying the first said current relatively to the second said current independently of the power supply circuit which is operative to energise the primary electrode means.

3. A furnace according to claim 2 wherein the auxiliary electrode means comprises a first auxiliary electrode, or first group of auxiliary electrodes, situated in the vicinity of the outlet and adjacent to primary electrodes of the spaced groups of the primary electrode means in the vicinity of the outlet, a further auxiliary electrode, or further group of auxiliary electrodes, spaced longitudinally of the flow path from the outlet, said auxiliary power supply being connected to said auxiliary electrodes and to said first auxiliary electrode, or groups of these auxiliary electrodes, in a manner such that the phase relationship of the voltage applied to said first auxiliary electrode, or first group of auxiliary electrodes, and that applied to said adjacent electrodes of the primary electrodes of the spaced groups, is such that little current flow is established between the first auxiliary electrode, or first group of auxiliary electrodes, and these primary electrodes.

4. A furnace according to claim 3 wherein said phase relationship is 45°.

5. A furnace according to either of claims 3 and 4 wherein the further auxiliary electrode, or further group of auxiliary electrodes, of the auxiliary electrode means spaced longitudinally of the flow path from the outlet, is also adjacent to primary electrodes of the spaced groups of the primary electrode means remote from the outlet.

6. A furnace according to claim 5 wherein the phase relationship between the voltage applied to the further auxiliary electrode, or further group of auxiliary electrodes, and that applied to the adjacent primary electrodes of the spaced groups, is such that little current flow is established between said further auxiliary electrode, or further group of auxiliary electrodes, and these primary electrodes.

7. A furnace according to claim 6 wherein the phase relationship specifically referred to therein is 45°.

8. A furnace according to claim 3 wherein the auxiliary electrode means comprises a third auxiliary electrode, or third group of electrodes, between said first and second electrodes, or group of electrodes, and wherein the third auxiliary electrode, or third group of auxiliary electrodes, is energised in a phase relationship with the other auxiliary electrodes, or groups of these auxiliary electrodes of the auxiliary electrode means, in a manner such that current flow between the first and third auxiliary electrode, or respective groups of such electrodes, is in phase or anti-phase with current flow between the second and third auxiliary electrode, or respective groups of such electrodes, and is in a direction generally parallel to the withdrawal flow path.

* * * * *